(12) United States Patent
Sasakuma et al.

(10) Patent No.: US 9,850,069 B2
(45) Date of Patent: Dec. 26, 2017

(54) RUBBER COMPOSITION AND CONVEYOR BELT USING SAME

(71) Applicant: The Yokohama Rubber Co., LTD., Minato-ku, Tokyo (JP)

(72) Inventors: Hidehiro Sasakuma, Hiratsuka (JP); Ryotaro Suefuji, Hiratsuka (JP); Gang Hou, Hiratsuka (JP); Atsushi Miyajima, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/313,529

(22) PCT Filed: May 22, 2015

(86) PCT No.: PCT/JP2015/064711
§ 371 (c)(1),
(2) Date: Nov. 22, 2016

(87) PCT Pub. No.: WO2015/182499
PCT Pub. Date: Dec. 3, 2015

(65) Prior Publication Data
US 2017/0197789 A1 Jul. 13, 2017

(30) Foreign Application Priority Data
May 26, 2014 (JP) ................................. 2014-108115

(51) Int. Cl.
*B65G 15/00* (2006.01)
*B65G 15/30* (2006.01)
(Continued)

(52) U.S. Cl.
CPC ................ *B65G 15/32* (2013.01); *C08L 7/00* (2013.01); *C08L 9/00* (2013.01)

(58) Field of Classification Search
None
See application file for complete search history.

(56) References Cited

U.S. PATENT DOCUMENTS 6,413,478 B1 *  7/2002  Mabry ................. B01F 5/0256
                                                         422/187
2014/0326928 A1  11/2014  Kitago et al.
2015/0001047 A1  1/2015  Nakano

FOREIGN PATENT DOCUMENTS

JP  2000-169630  6/2000
JP  2002-105248  4/2002
(Continued)

OTHER PUBLICATIONS

International Search Report for International Application No. PCT/JP2015/064711 dated Aug. 11, 2015, 4 pages, Japan.

*Primary Examiner* — Kavel Singh
(74) *Attorney, Agent, or Firm* — Thorpe North & Western

(57) ABSTRACT

The present technology provides a rubber composition containing: a diene-based rubber containing a natural rubber and a butadiene rubber; a carbon black 1; and a carbon black 2. A nitrogen adsorption specific surface area of the carbon black 1 is from 60 to 100 $m^2/g$; a dibutyl phthalate oil absorption of the carbon black 1 is 120 $cm^3/100$ g or less; a nitrogen adsorption specific surface area of the carbon black 2 is from 20 to 40 $m^2/g$; a dibutyl phthalate oil absorption of the carbon black 2 is from 70 to 95 $cm^3/100$ g; and a total amount of the carbon black 1 and the carbon black 2 being from 25 to 50 parts by mass per 100 parts by mass of the diene-based rubber.

5 Claims, 1 Drawing Sheet

(51) Int. Cl.
*B65G 15/32* (2006.01)
*C08L 7/00* (2006.01)
*C08L 9/00* (2006.01)

(56) References Cited

FOREIGN PATENT DOCUMENTS

| | | |
|---|---|---|
| JP | 2003-128844 | 5/2003 |
| JP | 2006-183805 | 7/2006 |
| JP | 2013-122018 | 6/2013 |
| JP | 2014-031248 | 2/2014 |
| JP | 2014-218555 | 11/2014 |
| WO | WO 2013/089069 | 6/2013 |

* cited by examiner

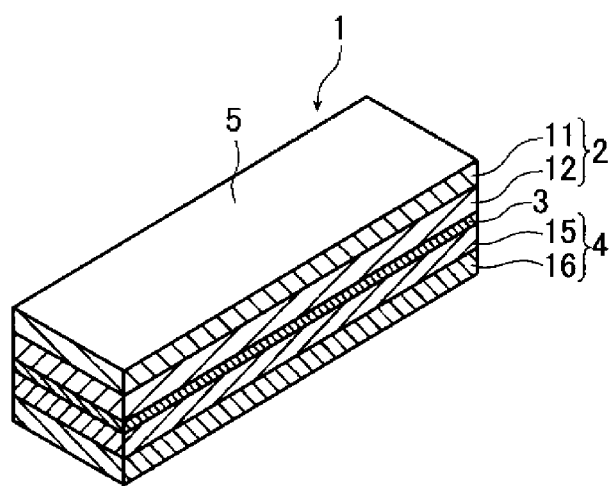

RUBBER COMPOSITION AND CONVEYOR BELT USING SAME

TECHNICAL FIELD

The present technology relates to a rubber composition and a conveyor belt using the same.

BACKGROUND ART

Conventional conveyor belts having energy-saving properties have employed a technique, for example, to reduce resistance for riding over by reducing energy loss of a bottom-surface-cover rubber.

To date, to provide a rubber composition for conveyor belts that can both achieve energy-saving properties and durability, a rubber composition for a conveyor belt, the rubber composition comprising:

(A) 100 parts by mass of a diene-based polymer, and (B) from 25 to 55 parts by mass of a carbon black containing a carbon black (b-1) having a nitrogen adsorption specific surface area of 60 to 100 $m^2/g$ and a dibutyl phthalate oil absorption of less than 110 mL/100 g, and a carbon black (b-2) having a nitrogen adsorption specific surface area of less than 60 $m^2/g$ and a dibutyl phthalate oil absorption of 110 mL/100 g or greater, has been proposed (Japanese Unexamined Patent Application Publication No. 2013-122018A).

However, conventional rubber compositions for conveyor belts do not achieve sufficient energy-saving effects.

Furthermore, when a conveyor belt is operated, energy loss occurs in cases where the conveyor belt sags by the load as well as by the resistance for riding over or in cases where trough deformity is caused.

Furthermore, as physical properties of a rubber composition used in the top-surface-cover rubber layer of a conveyor belt, in addition to high fracture characteristics, hardness, and tear strength, high bending fatigue resistance is also required because of the large bending deformation caused by a pulley.

SUMMARY

The present technology provides a rubber composition achieving excellent rubber physical properties (fracture characteristics, hardness, and tear strength; hereinafter the same) and bending fatigue resistance, while excellent energy-saving properties are maintained (that is, causing low energy loss), and a conveyor belt which uses the rubber composition.

The inventors of the present technology have found that the rubber composition containing: a diene-based rubber containing a natural rubber and a butadiene rubber; a carbon black 1; and a carbon black 2; an amount of the natural rubber constituting from 40 to 90% by mass of the diene-based rubber; an amount of the butadiene rubber constituting from 60 to 10% by mass of the diene-based rubber; a nitrogen adsorption specific surface area of the carbon black 1 being from 60 to 100 $m^2/g$; a dibutyl phthalate oil absorption of the carbon black 1 being 120 $cm^3/100$ g or less; a nitrogen adsorption specific surface area of the carbon black 2 being from 20 to 40 $m^2/g$; a dibutyl phthalate oil absorption of the carbon black 2 being from 70 to 95 $cm^3/100$ g; and a total amount of the carbon black 1 and the carbon black 2 being from 25 to 50 parts by mass per 100 parts by mass of the diene-based rubber can achieve excellent rubber physical properties and bending fatigue resistance while excellent energy-saving properties are maintained, and thus completed the present technology.

Specifically, the inventors discovered that the above can be achieved by the following features.

[1] A rubber composition containing: a diene-based rubber containing a natural rubber and a butadiene rubber; a carbon black 1; and a carbon black 2;

an amount of the natural rubber constituting from 40 to 90% by mass of the diene-based rubber; an amount of the butadiene rubber constituting from 60 to 10% by mass of the diene-based rubber;

a nitrogen adsorption specific surface area of the carbon black 1 being from 60 to 100 $m^2/g$; a dibutyl phthalate oil absorption of the carbon black 1 being 120 $cm^3/100$ g or less;

a nitrogen adsorption specific surface area of the carbon black 2 being from 20 to 40 $m^2/g$; a dibutyl phthalate oil absorption of the carbon black 2 being from 70 to 95 $cm^3/100$ g; and a total amount of the carbon black 1 and the carbon black 2 being from 25 to 50 parts by mass per 100 parts by mass of the diene-based rubber.

[2] The rubber composition according to [1] above, where an amount of the carbon black 1 is from 15 to 30 parts by mass per 100 parts by mass of the diene-based rubber.

[3] The rubber composition according to [1] or [2] above, where an amount of the carbon black 2 is from 15 to 25 parts by mass per 100 parts by mass of the diene-based rubber.

[4] The rubber composition according to any one of [1] to [3] above, further containing sulfur, where an amount of the sulfur is 3% by mass or less of the amount of the natural rubber.

[5] A conveyor belt produced by using the rubber composition described in any one of [1] to [4] above in a top-surface-cover rubber layer.

With the rubber composition of the present technology, a conveyor belt having excellent rubber physical properties and bending fatigue resistance, while excellent energy-saving properties are maintained, can be produced.

The conveyor belt of the present technology has excellent rubber physical properties and bending fatigue resistance while excellent energy-saving properties are maintained.

BRIEF DESCRIPTION OF DRAWING

FIG. 1 is a cross-sectional view schematically illustrating a preferred embodiment of the conveyor belt of the present technology.

DETAILED DESCRIPTION

The present technology is described in detail below.

First, the rubber composition of the present technology will be described.

The rubber composition of the present technology is a rubber composition containing: a diene-based rubber containing a natural rubber and a butadiene rubber; a carbon black 1; and a carbon black 2;

an amount of the natural rubber constituting from 40 to 90% by mass of the diene-based rubber; an amount of the butadiene rubber constituting from 60 to 10% by mass of the diene-based rubber;

a nitrogen adsorption specific surface area of the carbon black 1 being from 60 to 100 $m^2/g$; a dibutyl phthalate oil absorption of the carbon black 1 being 120 $cm^3/100$ g or less;

a nitrogen adsorption specific surface area of the carbon black 2 being from 20 to 40 m$^2$/g; a dibutyl phthalate oil absorption of the carbon black 2 being from 70 to 95 cm$^3$/100 g; and a total amount of the carbon black 1 and the carbon black 2 being from 25 to 50 parts by mass per 100 parts by mass of the diene-based rubber.

Carbon black having a small nitrogen adsorption specific surface area has a large particle diameter, and such carbon black can reduce energy loss of a rubber; however, if the amount thereof is too large, rubber physical properties such as fracture characteristics and bending fatigue resistance decrease.

Therefore, in the present technology, by using a carbon black 1 with a rubber composition containing a particular diene-based rubber and a carbon black 2, excellent rubber physical properties and bending fatigue resistance can be achieved while excellent energy-saving properties are maintained, and a balance of excellent energy-saving properties and high rubber physical properties and bending fatigue resistance can be achieved.

By using such a rubber composition with low energy loss and high toughness in, for example, a top-surface-cover rubber layer of a conveyor belt, it is possible to reduce the amount of electric power consumed to operate the conveyor belt as well as enhance durability and elongate the life of the conveyor belt.

Note that the above mechanism is an inference by the inventors of the present technology, but if the mechanism of the present technology is other than that described above, it is still within the scope of the present technology.

In the present specification, the cases where at least one of energy-saving properties, rubber physical properties, and bending fatigue resistance is superior may be referred to as "exhibiting superior effect of the present technology".

The diene-based rubber contained in the rubber composition of the present technology contains a natural rubber and a butadiene rubber.

The natural rubber (NR) contained in the diene-based rubber is not particularly limited. Examples thereof include conventionally known natural rubbers. One type of the natural rubber can be used alone or a combination of two or more types of the natural rubbers can be used.

The butadiene rubber (BR) contained in the diene-based rubber is not particularly limited. Examples thereof include conventionally known butadiene rubbers.

The weight average molecular weight of the butadiene rubber is preferably 400,000 or greater, and more preferably from 450,000 to 1,000,000, from the perspectives of making breaking strength and tear strength even higher after vulcanization and achieving excellent wear resistance. In the present technology, the weight average molecular weight of the butadiene rubber is a value obtained by gel permeation chromatography (GPC) measured based on calibration with standard polystyrene using tetrahydrofuran as a solvent.

One type of the butadiene rubber can be used alone or a combination of two or more types of the butadiene rubbers can be used.

In the present technology, the amount of the natural rubber is from 40 to 90% by mass of the diene-based rubber, and from the perspectives of exhibiting superior effect of the present technology and, in particular, achieving excellent rubber physical properties, the amount of the natural rubber is preferably from 50 to 85% by mass, and more preferably from 60 to 80% by mass, of the diene-based rubber.

Furthermore, the amount of the butadiene rubber is from 60 to 10% by mass of the diene-based rubber, and from the perspectives of exhibiting superior effect of the present technology and, in particular, achieving excellent rubber physical properties, the amount of the butadiene rubber is preferably from 50 to 15% by mass, and more preferably from 40 to 20% by mass, of the diene-based rubber.

The diene-based rubber may further contain another diene-based rubber besides the natural rubber and the butadiene rubber. Examples of such another diene-based rubber besides the natural rubber and the butadiene rubber include an isoprene rubber (IR), styrene-butadiene rubber (SBR), acrylonitrile-butadiene rubber (NBR), chloroprene rubber (CR), butyl rubber (IIR), ethylene-propylene-diene rubber (EPDM), and the like.

The total amount of the natural rubber and the butadiene rubber is preferably from 80 to 100% by mass of the diene-based rubber from the perspectives of exhibiting superior effect of the present technology and achieving excellent energy-saving properties.

When the diene-based rubber further contains another diene-based rubber besides the natural rubber and the butadiene rubber, the amount of the diene-based rubber besides the natural rubber and the butadiene rubber may be 20% by mass or less (of the total amount) of the diene-based rubber.

The carbon black 1 will be described below. The carbon black 1 contained in the rubber composition of the present technology is not particularly limited as long as it is a carbon black having a nitrogen adsorption specific surface area of 60 to 100 m$^2$/g and a dibutyl phthalate oil absorption of 120 cm$^3$/100 g or less. Examples thereof include conventionally known carbon blacks. Specific examples include an HAF carbon black.

The nitrogen adsorption specific surface area of the carbon black 1 is preferably from 65 to 95 m$^2$/g, and more preferably from 65 to 90 m$^2$/g, from the perspectives of exhibiting superior effect of the present technology and, in particular, achieving excellent energy-saving properties and fracture characteristics.

The dibutyl phthalate oil absorption of the carbon black 1 is preferably from 80 to 120 cm$^3$/100 g, and more preferably from 90 to 115 cm$^3$/100 g, from the perspectives of exhibiting superior effect of the present technology and achieving excellent fracture characteristics.

In the present technology, the nitrogen adsorption specific surface area of carbon black was measured in accordance with JIS K 6217-2:2001. Furthermore, the dibutyl phthalate oil absorption of carbon black was measured in accordance with JIS K 6217-4:2008.

One type or a combination of two or more types of the carbon blacks can be used as the carbon black 1.

The amount of the carbon black 1 is preferably from 15 to 30 parts by mass, and more preferably from 15 to 25 parts by mass, per 100 parts by mass of the diene-based rubber from the perspective of exhibiting superior effect of the present technology and, in particular, achieving excellent energy-saving properties and rubber physical properties.

The carbon black 2 will be described below. The carbon black 2 contained in the rubber composition of the present technology is not particularly limited as long as the carbon black has a nitrogen adsorption specific surface area of 20 to 40 m$^2$/g and a dibutyl phthalate oil absorption of 70 to 95 cm$^3$/100 g or less. Examples thereof include conventionally known carbon blacks. Specific examples include a GPF carbon black.

The nitrogen adsorption specific surface area of the carbon black 2 is preferably from 20 to 35 m$^2$/g, and more preferably from 20 to 30 m$^2$/g, from the perspectives of exhibiting superior effect of the present technology and, in particular, achieving excellent rubber physical properties.

The dibutyl phthalate oil absorption of the carbon black 2 is preferably from 70 to 90 $cm^3/100$ g, and more preferably from 75 to 90 $cm^3/100$ g, from the perspectives of exhibiting superior effect of the present technology and, in particular, achieving excellent rubber physical properties.

One type or a combination of two or more types of the carbon blacks can be used as the carbon black 2.

The amount of the carbon black 2 is preferably from 15 to 25 parts by mass, and more preferably from 20 to 25 parts by mass, per 100 parts by mass of the diene-based rubber from the perspectives of exhibiting superior effect of the present technology and, in particular, achieving excellent energy-saving properties and rubber physical properties.

In the present technology, the total amount of the carbon black 1 and the carbon black 2 is from 25 to 50 parts by mass per 100 parts by mass of the diene-based rubber, and from the perspectives of exhibiting superior effect of the present technology and, in particular, achieving excellent energy-saving properties and rubber physical properties, the total amount is preferably from 30 to 50 parts by mass, and more preferably from 30 to 45 parts by mass, per 100 parts by mass of the diene-based rubber.

The rubber composition of the present technology may further contain sulfur. The sulfur is not particularly limited. Examples thereof include conventionally known sulfur.

The amount of the sulfur is preferably 3% by mass or less, and more preferably from 1 to 3% by mass, of the amount of the natural rubber from the perspectives of exhibiting superior effect of the present technology and, in particular, achieving excellent bending fatigue resistance.

The rubber composition of the present technology may further contain additives besides the components described above within a scope that does not inhibit the effect or purpose of the present technology. Examples of the additive include carbon black other than the carbon black 1 and 2, white fillers, silane coupling agents, zinc oxide, stearic acid, anti-aging agents, processing aids, aroma oils, liquid polymers, terpene-based resins, thermosetting resins, vulcanization agents other than sulfur, vulcanization aids, vulcanization accelerators, and vulcanization retarders.

The production of the rubber composition of the present technology is not particularly limited. For example, the rubber composition of the present technology can be produced by kneading the diene-based rubber, the carbon black 1, the carbon black 2, and the additives that may be used as necessary (excluding the vulcanization system) described above using a Banbury mixer or the like, and then further kneading the sulfur, the vulcanization agent other than sulfur, the vulcanization aid, and the vulcanization accelerator using a roll kneader or the like.

Furthermore, the conditions of vulcanization are not particularly limited. For example, the vulcanization can be performed by applying heat and pressure in a condition at 140 to 160° C.

The rubber composition of the present technology can be used in, for example, a top-surface-cover rubber layer or bottom-surface-cover rubber layer of a conveyor belt.

The conveyor belt of the present technology will be described below.

The conveyor belt of the present technology is a conveyor belt produced by using the rubber composition of the present technology in a top-surface-cover rubber layer.

The conveyor belt of the present technology at least has a top-surface-cover rubber layer. The top-surface-cover rubber layer is formed by using the rubber composition of the present technology.

By using the rubber composition of the present technology in the top-surface-cover rubber layer, the conveyor belt of the present technology achieves excellent rubber physical properties and bending fatigue resistance while excellent energy-saving properties are maintained.

The conveyor belt of the present technology can further comprise, besides the top-surface-cover rubber layer, a reinforcing layer and a bottom-surface-cover rubber layer.

The conveyor belt of the present technology will be described below using an attached drawing. Note that the conveyor belt of the present technology is not limited to the attached drawing.

FIG. 1 is a cross-sectional view schematically illustrating a preferred embodiment of the conveyor belt of the present technology.

In FIG. 1, the conveyor belt 1 has a top-surface-cover rubber layer 2, a reinforcing layer 3, and a bottom-surface-cover rubber layer 4, which are laminated in this order. The surface of the top-surface-cover rubber layer 2 serves as a conveying face for transporting articles 5.

In the present technology, the top-surface-cover rubber layer is formed by using the rubber composition of the present technology.

Note that, when the top-surface-cover rubber layer has two or more layers as illustrated in FIG. 1, at least one layer or all the layers of the two or more layers may be formed by using the rubber composition of the present technology. Furthermore, from the perspectives of exhibiting superior effect of the present technology and achieving excellent energy-saving properties, at least the outermost layer is preferably formed by using the rubber composition of the present technology.

In FIG. 1, the top-surface-cover rubber layer 2 has an outer layer 11 and an inner layer 12. The outer layer 11 and/or the inner layer 12 may be formed by using the rubber composition of the present technology, and at least the outer layer 11 is preferably formed by using the rubber composition of the present technology.

When the outer layer 11 is formed by using the rubber composition of the present technology, the inner layer 12 may be a layer for adhering the inner layer 12 to the reinforcing layer 3 and the outer layer 11.

The rubber composition used in the bottom-surface-cover rubber layer is not particularly limited. Examples thereof include conventionally known rubber compositions.

The bottom-surface-cover rubber layer 4 has an outer layer 16 and an inner layer 15.

The outer layer 16 and the inner layer 15 may be formed by using the same or different rubber composition(s).

The reinforcing layer is not particularly limited, and substances typically used in conveyor belts can be suitably selected and used. Furthermore, the shape of the reinforcing layer is not particularly limited and, for example, may be a sheet form illustrated in FIG. 1 or may be in a form where reinforcing wires are embedded in parallel.

The thickness of the top-surface-cover rubber layer of the conveyor belt of the present technology is preferably from 3 to 20 mm.

The thickness of the bottom-surface-cover rubber layer is preferably from 3 to 20 mm, and more preferably from 5 to 15 mm.

Note that, when the top-surface-cover rubber layer is composed of two or more layers, the thickness of the top-surface-cover rubber layer indicates the total thickness of these layers. This also applies to the thickness of the bottom-surface-cover rubber layer.

The production of the conveyor belt of the present technology is not particularly limited. Examples thereof include conventionally known methods.

The conveyor belt of the present technology can be used to, for example, transport limestone.

EXAMPLES

Hereinafter, the present technology will be further described in detail with reference to examples; however, the present technology is not limited thereto.

Production of Rubber Composition

The constituents (part by mass) shown in Table 1 below were mixed to produce each of the rubber compositions (unvulcanized rubber compositions).

Evaluation

Each of the unvulcanized rubber compositions produced as described above was vulcanized as described below. Each of the physical properties after the vulcanization was measured and evaluated according to the method described below. The results are shown in Table 1 below. The suitable range of each of the evaluation results is also shown in the same table.

Production of Vulcanized Rubber Sheet

A vulcanized rubber sheet having a thickness of 2 mm was produced by vulcanizing each of the unvulcanized rubber compositions produced as described above by applying pressure in a condition at 148° C. for 30 minutes using a press molding machine.

Hardness

A test piece was produced from the vulcanized rubber sheet produced as described above, and Shore A hardness was measured in accordance with JIS K6253-3:2012, "Type A Durometer Hardness Test".

When the Shore A hardness is from 57 to 67, the test piece was evaluated as a test piece having a suitable hardness as a top-surface-cover rubber layer of a conveyor belt.

Breaking Strength and Elongation at Break

Using the test piece described above, tensile test was performed at a tensile speed of 500 mm/min in accordance with JIS K6251-2010, and breaking strength ($T_B$) [MPa] and elongation at break ($E_B$) [%] were measured at room temperature.

When the breaking strength is 18.0 MPa or higher, the test piece is evaluated as having a high breaking strength.

When the elongation at break is 400% or higher, the test piece is evaluated as having a high elongation at break.

Tear Strength

A test piece was cut out in a crescent shape from the vulcanized rubber sheet produced as described above in accordance with JIS K6252:2007, and a cut with a length of 1.0±0.2 mm was made in a central concave part in a manner that the cut was in a direction perpendicular to the main axis. The tear test was performed in a condition where the movement velocity of a test piece gripper was at 500 mm/min, and the tear strength [kN/m] was measured at room temperature.

Bending Fatigue Resistance (Crack Growth)

According to the flex crack growth test in accordance with JIS K6260:2010, a specified rubber sample (length: 15 cm; width: 5 cm; thickness: 6.3 mm) was produced by vulcanizing each of the unvulcanized rubber compositions produced as described above using a special mold in a condition at 148° C. At room temperature, the test piece was subjected to a total of 400,000 times of bending with a stroke of 20 mm at 300±10 times per minute, and then the length [mm] of the generated crack on the test piece was measured.

tan δ (20° C.)

Using a test piece cut out into a strip shape (20 mm length×5 mm width×2 mm thickness) from the vulcanized rubber sheet produced as described above, tan δ (20° C.) was measured using a viscoelastic spectrometer, manufactured by Toyo Seiki Seisaku-sho, Ltd. The measurement was performed by elongating the test piece for 10% and applying vibration with an amplitude of ±2% at a vibration frequency of 20 Hz in a condition at 20° C.

When the tan δ (20° C.) is 0.13 or less, the energy-saving properties are excellent.

TABLE 1

| | | | Working Example 1 | Working Example 2 | Working Example 3 | Working Example 4 | Working Example 5 | Working Example 6 |
|---|---|---|---|---|---|---|---|---|
| NR | | | 70 | 70 | 70 | 80 | 50 | 70 |
| BR | | | 30 | 30 | 30 | 20 | 50 | 30 |
| Carbon black | $N_2SA$ | DBP | | | | | | |
| ISAF | 101 | 114 | | | | | | |
| HAF | 70 | 101 | 30.00 | 22.50 | 15.00 | 30.00 | 30.00 | 15.00 |
| FEF | 38 | 104 | | | | | | |
| GPF | 29 | 84 | 15.00 | 20.00 | 25.00 | 10.00 | 10.00 | 30.00 |
| SRF | 23 | 66 | | | | | | |
| Total amount of carbon blacks | | | 45.00 | 42.50 | 40.00 | 40.00 | 40.00 | 45.00 |
| Sulfur | | 2.08 | 2.08 | 2.08 | 2.4 | 1.5 | 2.08 |
| Amount of sulfur relative to NR (% by mass) | | | 2.97% | 2.97% | 2.97% | 3.00% | 3.00% | 2.97% |
| Vulcanization accelerator | | | 1.50 | 1.50 | 1.50 | 1.5 | 1.5 | 1.50 |
| Hardness | | 57-67 | 61.6 | 61.0 | 59.2 | 59.0 | 57.6 | 61.2 |
| Breaking strength | | ≥18.0 | 21.9 | 20.7 | 20.3 | 22.5 | 18.4 | 19.4 |
| Breaking elongation | | ≥400 | 434 | 446 | 456 | 445 | 445 | 426 |

TABLE 1-continued

|  |  |  | Comparative example 1 | Comparative example 2 | Comparative example 3 | Comparative example 4 |
|---|---|---|---|---|---|---|
|  | NR |  | 70 | 70 | 70 | 85 |
|  | BR |  | 30 | 30 | 30 | 15 |
| Carbon black | $N_2SA$ | DBP |  |  |  |  |
| ISAF | 101 | 114 |  |  | 35.00 |  |
| HAF | 70 | 101 | 30.00 | 25.00 |  |  |
| FEF | 38 | 104 |  |  |  | 20.00 |
| GPF | 29 | 84 | 25.00 |  | 10.00 | 20.00 |
| SRF | 23 | 66 |  | 25.00 |  |  |
|  | Total amount of carbon blacks |  | 55.00 | 50.00 | 45.00 | 40.00 |
|  | Sulfur |  | 2.08 | 2.08 | 1.42 | 2.55 |
|  | Amount of sulfur relative to NR (% by mass) |  | 2.97% | 2.97% | 2.03% | 3.00% |
|  | Vulcanization accelerator |  | 1.50 | 1.50 | 1.3 | 1.5 |
|  | Hardness | 57-67 | 65.6 | 61.8 | 57.2 | 58.4 |
|  | Breaking strength | ≥18.0 | 20.1 | 18.6 | 22.4 | 20.2 |
|  | Breaking elongation | ≥400 | 373 | 379 | 537 | 441 |
|  | Tear strength | ≥40 | 52 | 68 | 97 | 56 |
|  | Bending fatigue resistance (crack growth) | ≤30 | 27 | 24 | 6 | Cut |
|  | Tan δ (20° C.) | ≤0.13 | 0.145 | 0.128 | 0.153 | 0.074 |

|  |  |  | Comparative example 5 | Comparative example 6 | Comparative example 7 | Comparative example 8 |
|---|---|---|---|---|---|---|
|  | NR |  | 70 | 70 | 71 | 35 |
|  | BR |  | 30 | 30 | 29 | 65 |
| Carbon black | $N_2SA$ | DBP |  |  |  |  |
| ISAF | 101 | 114 |  |  |  |  |
| HAF | 70 | 101 | 30.00 |  | 40.00 | 15.00 |
| FEF | 38 | 104 |  |  | 5.00 |  |
| GPF | 29 | 84 |  | 45.00 |  | 30.00 |
| SRF | 23 | 66 |  |  |  |  |
|  | Total amount of carbon blacks |  | 30.00 | 45.00 | 45.00 | 45.00 |
|  | Sulfur |  | 2.08 | 2.08 | 1.42 | 2.0 |
|  | Amount of sulfur relative to NR (% by mass) |  | 2.97% | 2.97% | 2.00% | 5.71% |
|  | Vulcanization accelerator |  | 1.80 | 1.80 | 1.30 | 1.5 |
|  | Hardness | 57-67 | 56.0 | 59.8 | 56.3 | 61.9 |
|  | Breaking strength | ≥18.0 | 21.6 | 18.9 | 23.8 | 12.9 |
|  | Breaking elongation | ≥400 | 457 | 437 | 531 | 352 |
|  | Tear strength | ≥40 | 39 | 18 | 47 | 88 |
|  | Bending fatigue resistance (crack growth) | ≤30 | 29 | 46 | 12 | 22 |
|  | Tan δ (20° C.) | ≤0.13 | 0.087 | 0.077 | 0.144 | 0.102 |

The details of each component shown in Table 1 are as follows. Note that the unit of nitrogen adsorption specific surface area ($N_2SA$) of carbon black is $m^2/g$, and the unit for dibutyl phthalate oil absorption (DBP) of carbon black is $cm^3/100$ g.

NR: Natural rubber RSS #3
BR: Butadiene rubber, Nipol BR 1220 (manufactured by Zeon Corporation; weight average molecular weight: 460,000)
ISAF carbon black: trade name: Show Black N220, manufactured by Cabot Japan K.K.
HAF carbon black: trade name: Show Black N330, manufactured by Cabot Japan K.K. This carbon black corresponds to the carbon black 1.
FEF carbon black: trade name: Diablack E, manufactured by Mitsubishi Chemical Corporation
GPF carbon black: trade name: Diablack G, manufactured by Mitsubishi Chemical Corporation. This carbon black corresponds to the carbon black 2.

SRF carbon black: trade name: Asahi #50, manufactured by Asahi Carbon Co., Ltd.

Sulfur: Oil-treated sulfur, manufactured by Hosoi Chemical Industry Co., Ltd.

Vulcanization accelerator: N-tert-butyl-2-benzothiazolyl-sulfenamide (Nocceler NS, manufactured by Ouchi Shinko Chemical Industrial Co., Ltd.)

As is clear from the results shown in Table 1, Comparative Example 1 having an excessive total amount of the carbon blacks resulted in high tan δ (20° C.) and small elongation at break.

Comparative Example 2 containing a carbon black with a dibutyl phthalate oil absorption that is different from the carbon black 2 resulted in small elongation at break.

Comparative Example 3 containing a carbon black with a nitrogen adsorption specific surface area that is greater than that of the carbon black 1 resulted in high tan δ (20° C.).

With Comparative Example 4 containing a carbon black with a nitrogen adsorption specific surface area that is less than that of the carbon black 1, the test piece was cut during the bending fatigue resistance test, and exhibited poor bending fatigue resistance.

Comparative Example 5 containing no carbon black 2 resulted in low hardness and low tear strength.

Comparative Example 6 containing no carbon black 1 resulted in low tear strength and low bending fatigue resistance.

Comparative Example 7 containing a carbon black with a dibutyl phthalate oil absorption that is greater than that of the carbon black 2 resulted in low hardness and high tan δ (20° C.).

Comparative Example 8 having a large compounded amount of the butadiene rubber resulted in poor fracture characteristics.

Contrary to these, Working Examples 1 to 6 achieved excellent rubber physical properties (fracture characteristics, hardness, and tear strength) and bending fatigue resistance, while excellent energy-saving properties were maintained (that is, caused low energy loss).

When Working Examples 1 to 3 and 6 are compared, Working Example 3 exhibited even higher tear strength and elongation at break and even lower tan δ (20° C.) compared to those of Working Examples 1, 2, and 6.

When Working Examples 1 to 6 are compared, Working Example 3 exhibited even higher elongation at break and even lower tan δ (20° C.) compared to those of Working Examples 1, 2, and 4 to 6.

The invention claimed is:

1. A rubber composition comprising: a diene-based rubber containing a natural rubber and a butadiene rubber; a carbon black 1; and a carbon black 2;

an amount of the natural rubber constituting from 40 to 90% by mass of the diene-based rubber; an amount of the butadiene rubber constituting from 60 to 10% by mass of the diene-based rubber;

a nitrogen adsorption specific surface area of the carbon black 1 being from 60 to 100 m$^2$/g; a dibutyl phthalate oil absorption of the carbon black 1 being 120 cm$^3$/100 g or less;

a nitrogen adsorption specific surface area of the carbon black 2 being from 20 to 40 m$^2$/g; a dibutyl phthalate oil absorption of the carbon black 2 being from 70 to 95 cm$^3$/100 g; and a total amount of the carbon black 1 and the carbon black 2 being from 25 to 50 parts by mass per 100 parts by mass of the diene-based rubber.

2. The rubber composition according to claim 1, wherein an amount of the carbon black 1 is from 15 to 30 parts by mass per 100 parts by mass of the diene-based rubber.

3. The rubber composition according to claim 1, wherein an amount of the carbon black 2 is from 15 to 25 parts by mass per 100 parts by mass of the diene-based rubber.

4. The rubber composition according to claim 1, further comprising sulfur, wherein an amount of the sulfur is 3% by mass or less of the amount of the natural rubber.

5. A conveyor belt produced by using the rubber composition described in claim 1 in a top-surface-cover rubber layer.

* * * * *